Patented Jan. 6, 1942

2,268,647

UNITED STATES PATENT OFFICE 2,268,647

COMPOSITION AND PROCESS FOR THE TREATMENT OF SEWAGE AND WASTE MATERIAL AND SLUDGES THEREFROM

Paul F. Dilles, Alphonse F. Dilles, and Frank A. Dilles, New York, N. Y., assignors, by mesne assignments, to Paul F. Dilles No Drawing. Application December 8, 1939, Serial No. 308,134

6 Claims. (Cl. 210—2)

This invention relates to a physical and chemical process for treating sewage and industrial waste water. This process has for its object the provision of a new composition permitting purification, reclamation and reuse of sewage, garbage and industrial waste spent waters. The precipitate recovered after de-watering is used as a fertilizer.

A particular object of the invention is the provision of a new composition for the treatment of liquid sewage in relatively large volume by which not only much or practically all of the material in suspension in the sewage may be precipitated, but by which the treated liquid may become free or relatively free from bacteria.

A further object of the invention is the provision of a new and novel process for the treatment of liquid sewage or industrial waste.

A further object of the invention is the provision of an economical process and composition for the treatment of municipal sewage, so as to render same harmless and aseptic, and in which both the precipitated matter and the supernatant liquid may be readily disposed of.

The basic material used by us in causing precipitation of the suspended and colloid matter in the sewage is of the following composition:

| | Per cent |
|---|---|
| Mercurous oxide | 4 |
| Potassium dichromate | 11 |
| Sodium bicarbonate | 68 |
| Sodium carbonate | 8½ |
| Zinc oxide | 8½ |

Fifty pounds of this material are dissolved in five hundred parts of water, making five hundred and fifty pounds of solution. Of this solution only eight pounds are required for the treatment of a million pounds of sewage.

It should be noted that the liquid treated water sewage or industrial waste spent water should be made slightly alkaline with one of the well-known alkaline materials, such as lime water or calcium hydroxide, the object being to produce a slightly alkaline liquid having a pH of between 7.4 and 7.8. On the average, about twenty-two pounds of calcium hydroxide per one million pounds of sewage are necessary to obtain the required alkalinity.

No particular technique is required in the treatment of liquid sewage with the above composition of mercurous oxide, potassium dichromate, sodium bicarbonate, sodium carbonate and zinx oxide, except that the solution containing this material is gradually added in considerable dilution to the liquid sewage and that all parts of the sewage are brought in contact with the composition. When brought in contact with the composition, a heavy floc or precipitate is created, and at the same time the liquid is made relatively free from odor, color and bacteria.

In particular, the colloidal structure in the sewage and industrial waste spent water is caused to be entrained in this heavy floc and precipitated. As most of the turbidity in sewage and industrial waste spent water or in any turbid liquid is caused by the colloidal structure in suspension, the removal of this colloidal structure, settleable solids and other suspended matter will result in a clear supernatant liquid.

The material above mentioned will not completely dissolve in water, about eight per cent of this suspended material acting largely as the nucleoli around which the contained bacteria in the sewage is precipitated.

An important feature of the use of the composition and process above outlined is the fact that the bacteria which are present in immense numbers in the sewage and growing therein are precipitated along with the floc formation, the colloidal matter precipitated consisting largely of masses of bacteria. The precipitate or sludge obtained may be dried by any well-known methods. The dry material is valuable as a fertilizer.

While we have described the use of this material for the treatment of liquid sewage particularly, we do not wish to be limited in the use of this composition for this purpose, as the same composition is useful in the treatment of industrial wastes of various kinds and with many of same is equally efficacious.

Having fully described our invention, what we claim is:

1. A composition for purifying liquid sewage and industrial waste-water by the precipitation of impurities from the liquid to be purified, said composition consisting of about 4% of mercurous oxide, about 11% of potassium dichromate, and about 8½% of zinc oxide in mixture with water-soluble alkaline salts.

2. A composition for purifying liquid sewage and industrial waste water by the precipitation of impurities from the liquid to be purified, said composition consisting of about 4% of mercurous oxide, in mixture with potassium dichromate, zinc oxide and water-soluble alkaline salts.

3. A composition for purifying liquid sewage and industrial waste water by the precipitation of impurities from the liquid to be purified, said composition consisting of about 4% of mercurous oxide, about 11% of potassium dichromate, about 8½% of zinc oxide, about 68% of sodium bicarbonate, and about 8½% of sodium carbonate.

4. In the purification of liquid sewage and industrial waste water, the process which comprises first rendering said sewage and industrial waste water alkaline, and then precipitating therefrom impurities by the addition of a composition which consists of about 4% mercurous oxide, about 11% potassium dichromate, and about 8½% zinc oxide in mixture with water-soluble alkaline salts, and is diluted with water.

5. In the purification of liquid sewage and industrial waste water, the process which comprises mixing about 4 parts of mercurous oxide, about 11 parts of potassium dichromate, about 68 parts of sodium bicarbonate, about 8½ parts of sodium carbonate and about 8½ parts of zinc oxide, dissolving the mixture thus obtained in 1000 parts of water and precipitating impurities from a slightly alkaline liquid to be purified by adding at least 8 parts of said mixture dissolved in water to one million parts of said liquid.

6. A process for purifying liquid sewage and industrial waste water by rendering same mildly alkaline and precipitating impurities therefrom by the addition of a diluted aqueous solution of a composition containing about 4% mercurous oxide.

PAUL F. DILLES.
ALPHONSE F. DILLES.
FRANK A. DILLES.